US009788151B2

(12) United States Patent
Duan et al.

(10) Patent No.: US 9,788,151 B2
(45) Date of Patent: Oct. 10, 2017

(54) METHOD, SYSTEM, AND APPARATUS FOR DETERMINING AND PROVISIONING LOCATION INFORMATION OF WIRELESS DEVICES

(71) Applicant: RED POINT POSITIONING CORPORATION, Brookline, MA (US)

(72) Inventors: Chunjie Duan, Brookline, MA (US); Matt Gross, Boston, MA (US); Jonathan Horne, Boudler, CO (US); Antti Korhonen, Fairfax, VA (US); Zhenzhen Ye, Groton, MA (US)

(73) Assignee: RED POINT POSITIONING CORPORATION, Brookline, MA (US)

( * ) Notice: Subject to any disclaimer, the term of this patent is extended or adjusted under 35 U.S.C. 154(b) by 0 days.

(21) Appl. No.: 15/001,866

(22) Filed: Jan. 20, 2016

(65) Prior Publication Data
US 2016/0212579 A1   Jul. 21, 2016

Related U.S. Application Data (60) Provisional application No. 62/105,338, filed on Jan. 20, 2015, provisional application No. 62/105,369, filed on Jan. 20, 2015.

(51) Int. Cl.
*H04B 1/00* (2006.01)
*H04W 4/02* (2009.01)
(Continued)

(52) U.S. Cl.
CPC ............ *H04W 4/02* (2013.01); *H04B 1/7163* (2013.01); *H04W 4/008* (2013.01); *H04W 4/22* (2013.01)

(58) Field of Classification Search
CPC ....... H04W 64/00; H04W 4/04; H04W 4/008; H04W 4/02; H04W 64/003; H04W 12/12;
(Continued)

(56) References Cited

U.S. PATENT DOCUMENTS 8,867,993 B1 * 10/2014 Perkins ................ H04B 5/0025
455/41.1
2001/0036835 A1   11/2001 Leedom
(Continued)

OTHER PUBLICATIONS

International Search Report and Written Opinion for International Application No. PCT/US16/14103, dated Jun. 20, 2016 (20 pages).
(Continued)

*Primary Examiner* — Khanh C Tran
(74) *Attorney, Agent, or Firm* — Nutter McClennen & Fish LLP (57) ABSTRACT

A system and method for locating a mobile device is disclosed. In a first embodiment, a system of provisioning multiple-tired location services is disclosed. The system includes a plurality of ultra-wideband devices forming a first level of a wireless infrastructure network and a plurality of location capable beacon devices forming a second level of the wireless infrastructure network. In a second embodiment, a method of providing location based services using location capable beacon devices is disclosed. In other embodiments a system for generating real-time safety alerts is further disclosed.

22 Claims, 11 Drawing Sheets

(51) Int. Cl.
*H04W 4/00* (2009.01)
*H04W 4/22* (2009.01)
*H04B 1/7163* (2011.01)

(58) Field of Classification Search
CPC .............. H04W 4/023; G06K 7/10306; G06K 7/10366; H04M 1/7253; H04M 1/72572; H04M 2250/06; H04Q 2209/47; H04Q 2209/826; H04L 63/12
See application file for complete search history.

(56) References Cited

U.S. PATENT DOCUMENTS

| | | | |
|---|---|---|---|
| 2002/0109601 A1* | 8/2002 | Arens | G08B 13/1427 340/573.1 |
| 2005/0054350 A1* | 3/2005 | Zegelin | G01S 5/0063 455/456.1 |
| 2006/0053057 A1 | 3/2006 | Michael | |
| 2006/0106850 A1 | 5/2006 | Morgan et al. | |
| 2007/0254676 A1* | 11/2007 | Pedigo | G01S 19/05 455/456.6 |
| 2008/0204322 A1* | 8/2008 | Oswald | G01S 5/04 342/465 |
| 2012/0011365 A1 | 1/2012 | Schmidt et al. | |
| 2012/0086552 A1 | 4/2012 | Fast et al. | |
| 2014/0091927 A1* | 4/2014 | Daniele | G08B 21/0208 340/539.13 |
| 2015/0076993 A1* | 3/2015 | Mohan | G01S 5/0027 315/153 |
| 2015/0247913 A1* | 9/2015 | Messier | G01S 19/48 340/539.13 |
| 2016/0055732 A1* | 2/2016 | Howard | G08B 21/0272 340/539.13 |
| 2016/0180674 A1* | 6/2016 | Hoehn | G08B 13/2402 340/572.1 |

OTHER PUBLICATIONS

Invitation to Pay Additional Fees for International Application No. PCT/US16/14103, dated Mar. 25, 2016.

* cited by examiner

METHOD, SYSTEM, AND APPARATUS FOR DETERMINING AND PROVISIONING LOCATION INFORMATION OF WIRELESS DEVICES

CROSS-REFERENCE TO RELATED APPLICATIONS

This application claims priority under 35 U.S.C. §119(e) to U.S. Provisional Patent Application No. 62/105,338, filed Jan. 20, 2015, and entitled "METHOD AND SYSTEM FOR PROVISIONING MULTI-TIERED LOCATION SERVICES" and to U.S. Provisional Patent Application No. 62/105,369, filed Jan. 20, 2015, and entitled "METHOD, SYSTEM AND APPARATUS FOR DETERMINING AND PROVISIONING OF LOCATION INFORMATION OF WIRELESS DEVICES," the entireties of which are incorporated by reference herein.

FIELD OF INVENTION

This invention relates generally to wireless locationing systems, and more particularly to methods and systems for determining the location of wireless beacon devices, and to methods and systems for provisioning location information to wireless devices.

BACKGROUND

Location services for determining a user's relative location have become ubiquitous. For example, Global Navigation Satellite Systems such as Global Position System (GPS) provide location services in outdoor environments. For indoor environments, there are many products based on different technologies that provide real-time location services. Applications often have very different requirements for accuracy, real-time latency and etc. At the same time, different technologies generally offer different quality of location service. Providing location services to smart phones and tablet devices has been a focus because of their popularity and ability to integrate with other services.

Using Bluetooth or WiFi signal to estimate location has been implemented because the availability of these devices in consumer products. In one example, iBeacon is an indoor proximity system that Apple Inc. calls "a new class of low-powered, low-cost transmitters that can notify nearby iOS 7 devices of their presence." The technology enables a device or other hardware to send push notifications to devices in close proximity to the iBeacon devices. Devices can also receive iBeacon advertisements. The iBeacon works on Bluetooth Low Energy (BLE), also known as Bluetooth Smart. BLE can also be found in Bluetooth 4.0 devices that support dual mode. One potential application of iBeacon is a location-aware, context-aware, pervasive small wireless sensor beacon that could pinpoint users' location in a store. iBeacon devices could send notifications of items nearby that are on sale or items customers may be looking for, and it could enable payments at the point of sale (POS) where customers don't need to remove their wallets or cards to make payments. Similar to iBeacon, there are other technologies including RFID and Near Field Communication (NFC) systems that offer 'proximity sensing' based location services. Generally, any wireless transmitter with a known location can serve as a beacon device, or beacon.

In another example, there are many commercial systems that utilize WiFi access points (APs) as beacons. WiFi access points are used to determine the location of a WiFi enabled devices. Companies such as Ekahau offer dedicated WiFi-based real-time location system (RTLS) solutions for hospitals, shopping malls, and etc. Many chip companies including Qualcomm (Atheros) and Broadcom offer radio chips with location service support. A WiFi receiver's location can be estimated based on the received signal strength from these APs.

Figure 1:
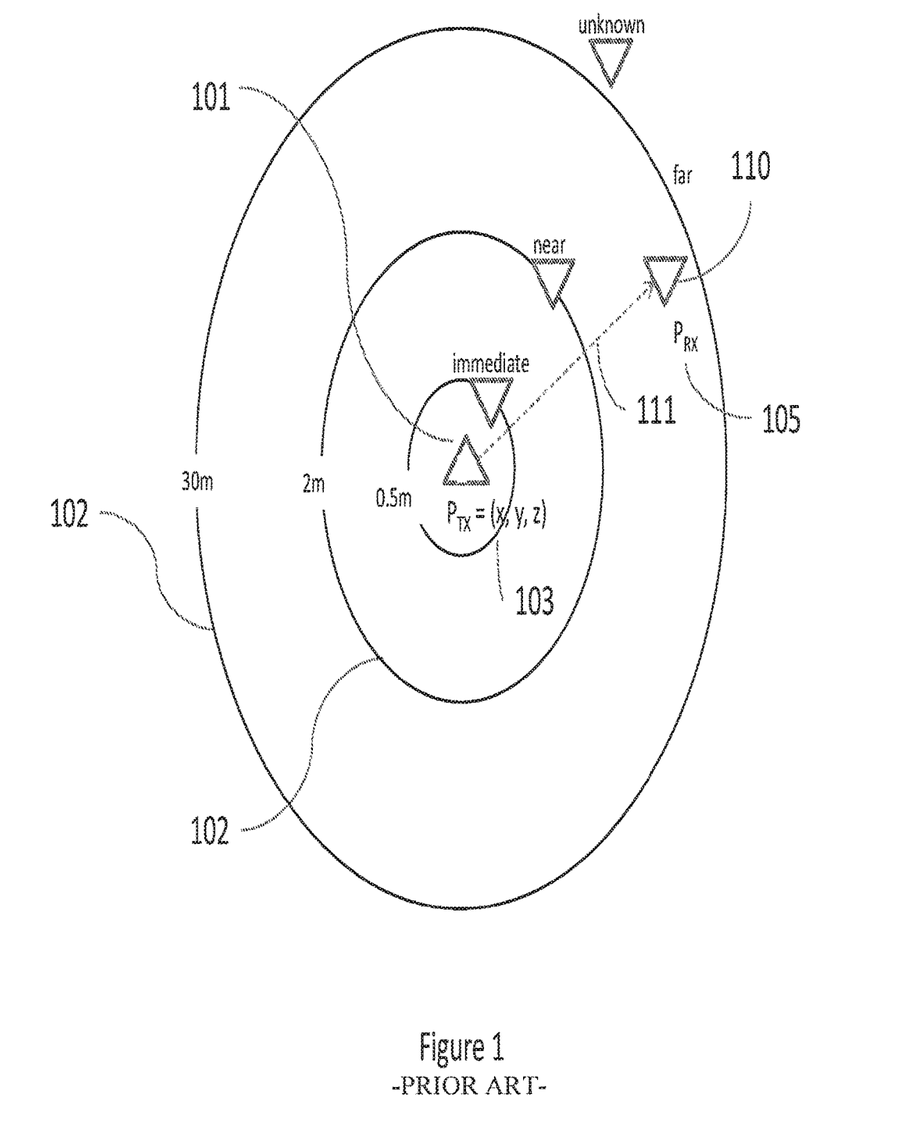
FIG. 1 illustrates an iBeacon system (Prior Art)

FIG. 1 illustrates an iBeacon proximity sensing system 100, consisting of iBeacon transmitters 101 and receivers 110. The iBeacon transmitter 101, having a known location 103, broadcasts beacon messages 111 which are received by receiver 110. A receiving device 110 can estimate its distance 102 to an iBeacon transmitter 101 using the received signals 111 to determine the receiving device's 110 location 105.

A beacon message typically includes specific information. For example, an iBeacon capable beacon message includes a universally unique identifier, which is picked up by a compatible app or operating system that can be turned into a physical location or trigger an action on the device such as a check-in on social media or a push notification. The location of the beacon transmitter $P_{TX}$ 103 is configured beforehand. Note that in real implementation, most of the beacon devices have both a transmitter and a receiver and are referred to as beacon transceivers 120 (not shown in FIG. 1).

Existing beacon systems require a user to manually enter the locations of the transmitter 103. This is time-consuming and prone to human error. Additionally, the location information is static and not able to be updated in real-time. Therefore, outdated information can cause problems when a beacon is moved or is moving. The system is not able to detect the location change and therefore cannot update the locations of the beacons automatically.

Proximity-sensing systems, like iBeacons, generally offer low power, low cost, and low complexity location services at the price of poor accuracy, large latency and discontinuous (intermittent) services. These systems are not capable of estimating the accurate, up-to-date location of the mobile device. The aforementioned wireless location systems are based on received signal strength and generally have accuracy and resolution measured in meters, or tens of meters. For example, the iBeacon system is only able to detect if a receiver is relatively 'immediate', 'near', 'far', or 'unknown'. The accuracy afforded by these types of systems is not good enough for certain applications.

In contrast, there are high precision RTLS products available based on other technologies such as Ultra-Wideband (UWB). An UWB RTLS system is capable of providing an accurate location estimate to within 15 cm and has an update rate much higher than 1 Hz. These systems can detect and update the tag locations in real time.

Figure 2:
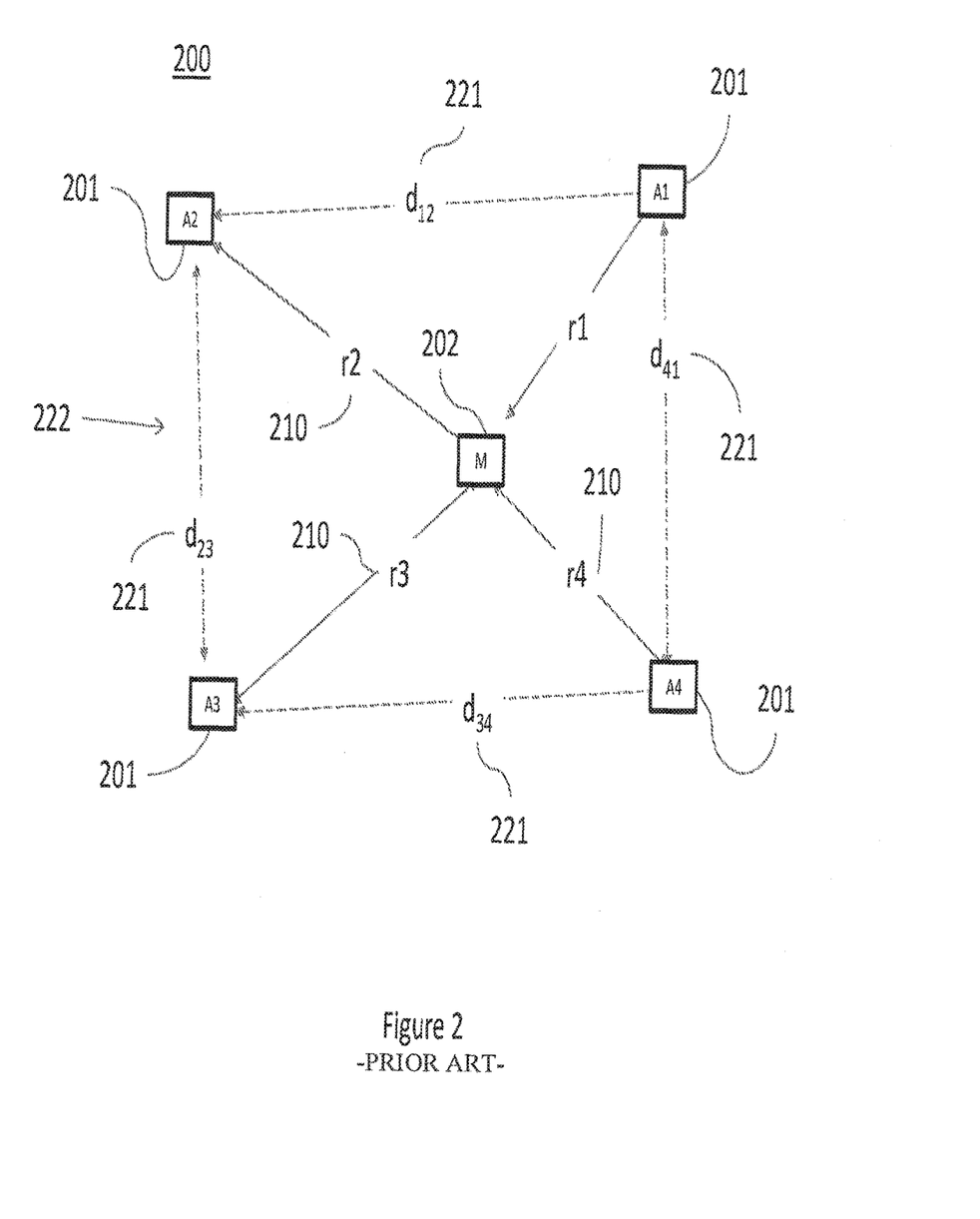
FIG. 2 illustrates an UWB RTLS network (Prior Art)

FIG. 2 shows an example of a UWB-based locationing system 200. Typically, an UWB RTLS system consists of an infrastructure network 222 and tags 202. An infrastructure network 222 further consists of multiple UWB anchor devices 201. The tag 202 locations are estimated by measuring the time-of-flight of signals between nodes, or anchor devices 201, which are subsequently converted into distances 210. The anchor device 201 locations are generally known and considered static. However, there are cases when anchor positions can be estimated on the fly. A tag 202 is a device which location is to be determined. The locations of UWB tags 202 can be determined based on the timing information and/or anchor locations provided by the infrastructure network 222. UWB tag 202 locations can be estimated with high accuracy. The location of the tag 202 may be determined by the tag (locally) or by the system (in the back end). A tag being able to determine its own location is referred to as the locationing device hereinafter.

UWB RTLS infrastructure networks can also be designed to be self-locating and self-calibrating. Self-localization refers to the capability of a system determining the anchor locations automatically or semi-automatically. Self-calibration refers to the capability of system detecting, correcting or compensating and changes of anchor position or link condition and correcting the changes if necessary.

While UWB location systems have superior performance in both accuracy and real-time operation, they are not ubiquitously available. Moreover, the cost of UWB transceivers is generally higher, and UWB transceivers are not embedded in most of consumer electronics, such as smart phones and tablets. To take advantage of the location services provided by an UWB RTLS network, a user is required to carry the UWB radio node (UWB tag) as an extra device.

However, there exist many applications in which it is desirable for a number of different use cases to coexist in the same coverage area. Each use case has different Quality of Service (QoS) requirements and constraints such as cost and power. For example, asset tracking and navigation may be both needed for construction site RTLS systems. However, for asset tracking, it is desirable for the tags to be in compact form factor and of low cost. Whereas, for navigation, the accuracy requirements are high. It is therefore desirable to have a unified system that provides different services as opposed to a plurality of separate systems.

SUMMARY

Devices, systems and methods are generally provided for wireless locationing systems. In one exemplary embodiment, a method includes the method steps of constructing location-capable wireless beacon apparatus by connecting a locationing device (e.g., an UWB receiver which is capable of determining its location) to a beacon device (transmitter, receiver, or transceiver). The collocated locationing device generates the real-time location and the beacon device transmits or receives beacon messages.

In another exemplary embodiment, a method and a system estimates and updates beacon locations automatically and includes an Ultra-Wideband (UWB) infrastructure and location-capable beacon devices. The location-capable beacon device can update its location using the estimated location by the UWB receiver within. The beacon device can then transmit the up-to-date location in the beacon messages, or it can report its location update to a location-based-service system.

In a further exemplary method, the method can include determining the location of a beacon transmitting device using a location-capable (LC) beacon receiver. An LC beacon receiver can record the latest location of a beacon transmitter when it is determined that the transmitter is very close.

In a yet further exemplary method, the method can include producing received signal strength (RSS) fingerprints of the beacon device, by using location capable beacon receivers. The location-capable receivers can measure the received signal strength from the beacon and associate it with the location automatically. These measurements can be stored in a database.

The method can further include a step to estimate the location of a beacon transmitter, using one or more location-enabled beacon receivers. The location-capable receivers can measure the received signals. The location of the transmitting beacon can be estimated based on multiple measurements from one or more such receivers.

Another exemplary method includes steps to provide location-based alerts (service) using the location-capable devices described herein. The safety alert can be generated by a first location capable (LC) device broadcasting its location in the beacon messages, and a second LC device receiving the beacon messages, and computing the distance between the two LC devices, and generating safety alert with rules based on the computed distance.

In a still further exemplary method, the method can include steps of provisioning location services of different qualities to different type of radio devices using a heterogeneous, multiple tier network. Each tier of such a network can further include of a set of radio devices. Each tier offers location services with different qualities such as accuracy and latency. A device may participate in the location services from different tiers. Devices may receive location services in one tier and use the location information received to provide location services to the tier below. Generally, the top tier can offer location service of the highest quality. The location accuracy of the device in a lower tier can generally be worse than the location accuracy of the devices in higher tiers. Devices in one tier may be of different type than devices in other tiers. One tier may only communicate with adjacent tiers.

A device can combine services from different tiers to obtain the services of higher quality. The location information from lower tier can also be provided to higher tiers for improvement of quality of service in the upper tier.

DETAILED DESCRIPTION

Acronyms

Figure 3A:
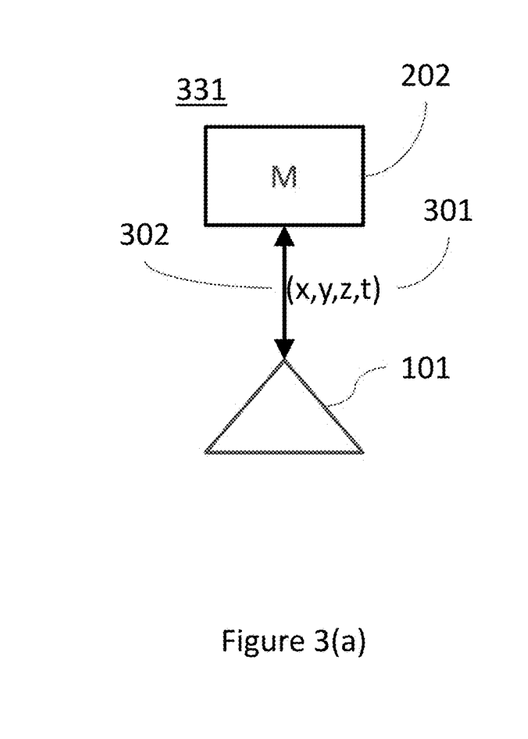
FIG. 3(a) illustrates a schematic of a location-capable beacon transmitter.
Figure 3B:
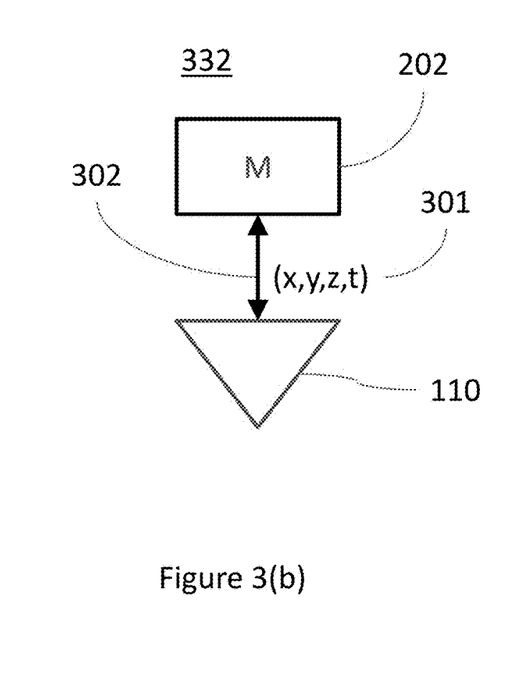
FIG. 3(b) illustrates a schematic of a location-capable beacon receiver.
Figure 3C:
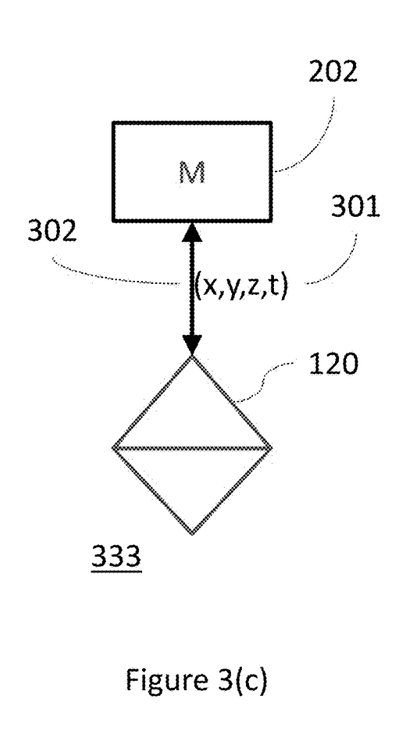
FIG. 3(c) illustrates a schematic of a location-capable beacon transceiver.

UWB—Ultra Wideband
BT—Bluetooth, or Bluetooth transceiver
BLE—Bluetooth Low Energy, or Bluetooth low energy transceiver
LC-TX—location-capable beacon transmitter
LC-RX—location-capable beacon receiver
LC-XCVR—location capable beacon transceiver
RSS—received signal strength FIGS. 3(a)-(c) illustrate schematics of location-capable beacon devices 331, 332, 333. As shown in FIG. 3(a) A location-capable beacon transmitter 331 can include a locationing device (UWB tag) 202 and a beacon transmitter 101. The locationing device 202 and beacon transmitter 101 can be connected via an interface 302. The real-time location information 301 can be sent from the locationing device 202 to the beacon transmitter 101. Any of the location-capable beacon devices can be self locating beacon devices. A self-locating beacon device is capable of discerning its own relative location without the need for an additional device to aid in that process.

As shown in FIG. 3(b) a location-capable beacon receiver 332 can include a locationing device 202 and a beacon receiver 110. Further, as shown in FIG. 3(c) a location-capable beacon transceiver 333 can include a locationing device 202 and a beacon transceiver 120. One of ordinary skill in the art will appreciate that a beacon transmitter can be a Bluetooth transmitter, or other types of RF transmitter. The beacon transmitter can also be an RFID tag. Further, the beacon receiver can be a Bluetooth receiver or an RFID reader.

One example of a location-capable beacon device can include a UWB tag and a Bluetooth transceiver. The UWB tag can keep track of real-time location and the Bluetooth transceiver can transmit, or receive, beacon messages, such as iBeacon messages.

It is understood to a person having skill in the art that an LC-XCVR 333 can be substituted for an LC-TX 331, or an LC-RX 332 by simply not using the unneeded functions.

Figure 4:
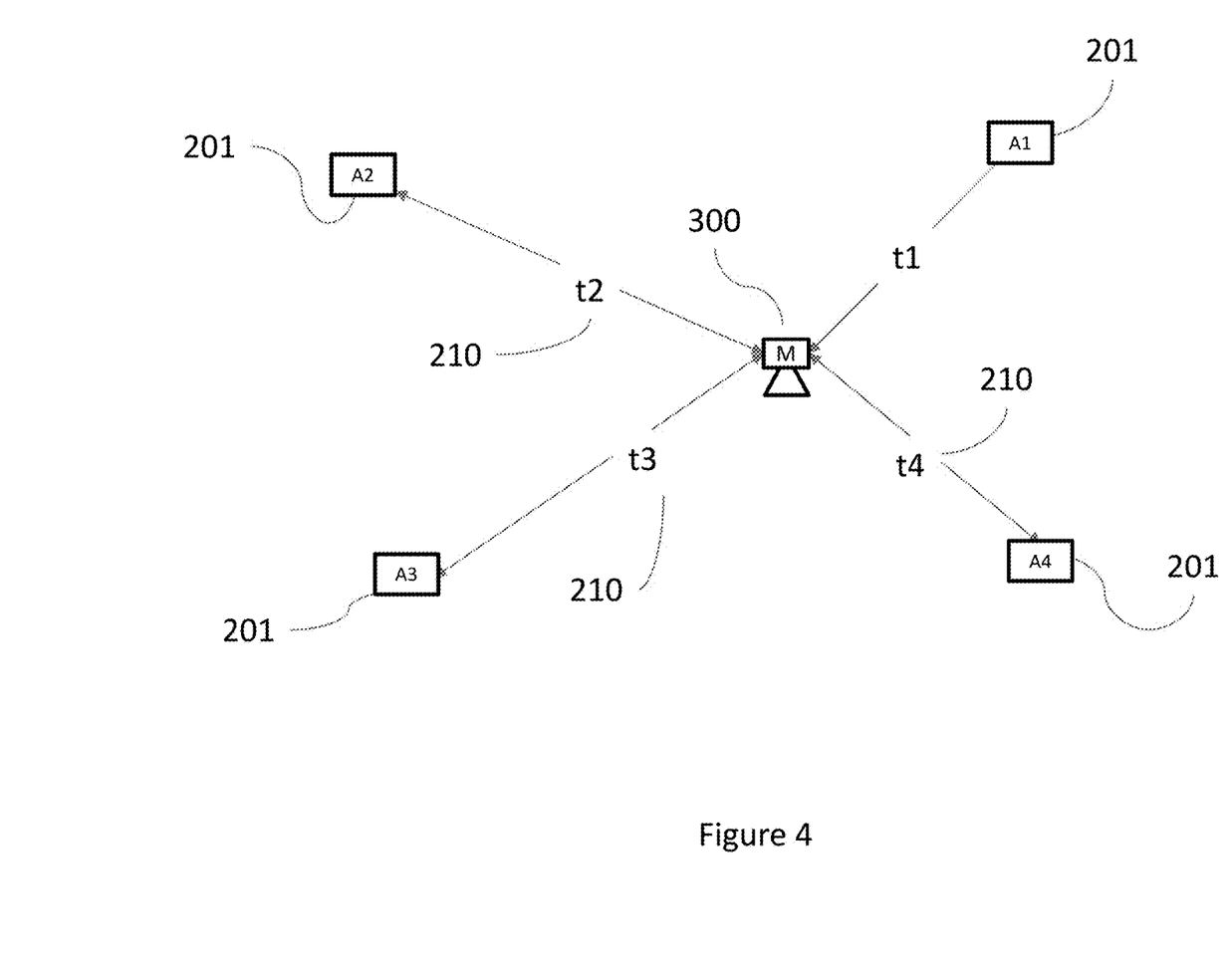
FIG. 4 illustrates a location-capable beacon system updating its location by receiving location services by a locationing system.

FIG. 4 illustrates a location-capable beacon device 300 and an infrastructure network providing location services. The infrastructure network consists of UWB anchors 201. The location of a beacon device 300 is determined in real-time by the UWB tag within the device 300 using the time of flight information 210. As illustrated, the location is based on the Time-of-Arrival information. The system can be implemented using Time-Difference-of-Arrival (TDoA) or other techniques.

Figure 5A:
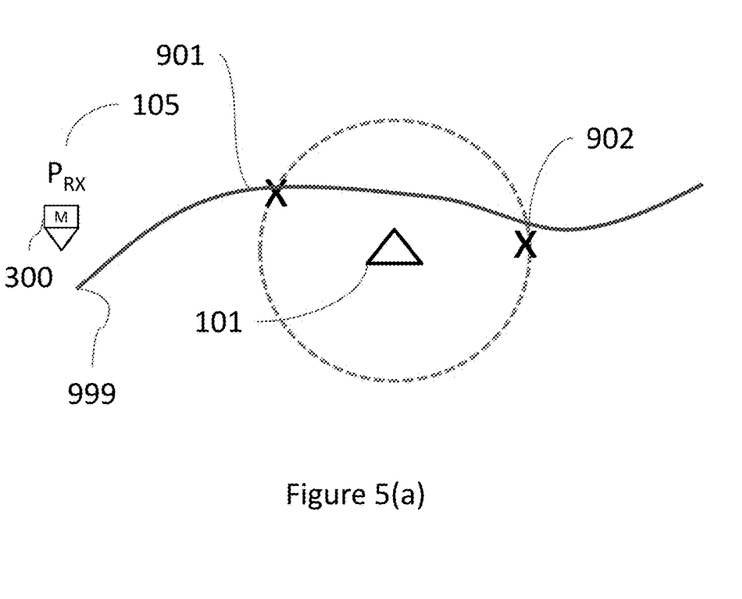
FIG. 5(a) illustrates a diagram for determination the location of a non-location-capable beacon.
Figure 5B:
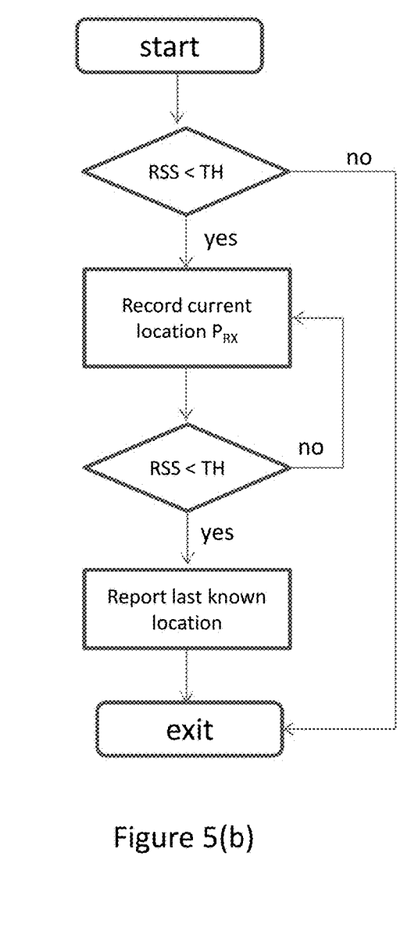
FIG. 5(b) illustrates a method of recording the last known location of a beacon transmitter using a LC receiving device of FIG. 5(a)

FIG. 5(a) illustrates a schematic diagram for determining the location of a non-location-capable beacon transmitter 101 using a location capable beacon device 300. FIG. 5(b) is a corresponding flow chart describing the steps of determining the location of a non-location capable beacon transmitter 101. An LC-RX device 300, traveling on the path 999, can estimate the distance to a beacon transmitter 101. The LC-RX device 300 can start recording the location when the estimated distance is 'close', for instance, between location 901 and 902 as illustrated in FIG. 5(a). When the distance is no longer 'close', the LC-RX device 300 stops recording the location and report the last known location to the system. The LC-RX device 300 can pass the stationary beacon transmitter 101 and thereby register the transmitter's 101 location. The system can record when the LC-RX device 300 is in range of the beacon transmitter first, then records when the two are separated. The location where the two devices are separated is registered. Then the distance can be estimated using the Received Signal Strength (RSS) of the beacon messages transmitted by the transmitter 101. 'Close' is often defined as when an RSS is greater than a certain predetermined threshold value.

Figure 6:
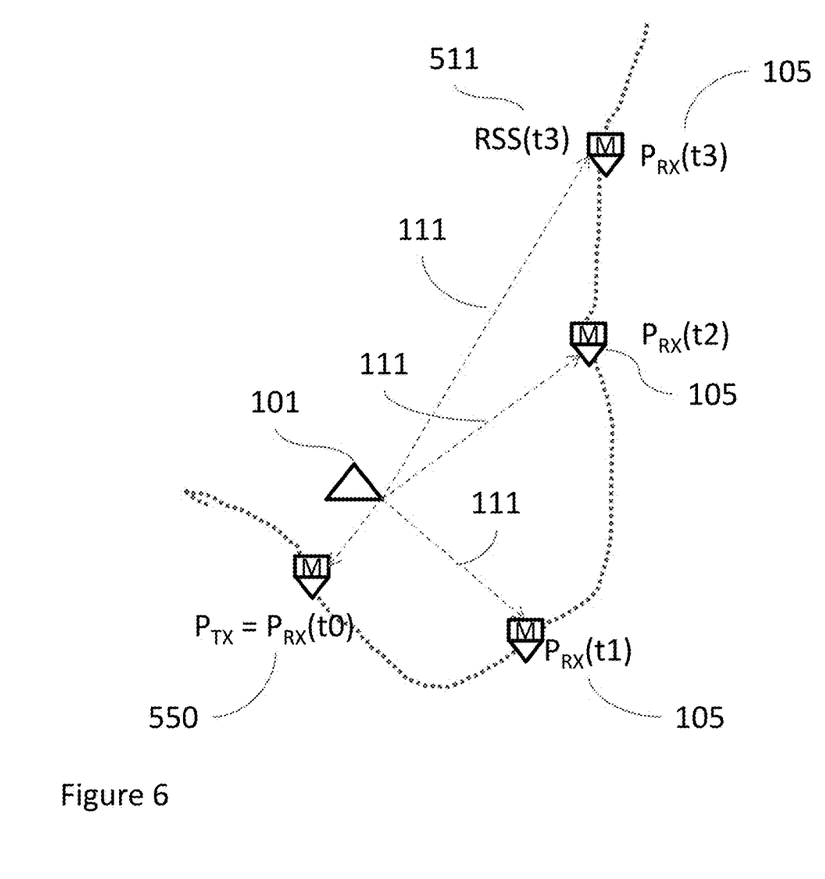
FIG. 6 illustrates a method of estimating a beacon transmitter location using multiple measurements from a single LC-RX.

FIG. 6 illustrates another method for determining the location of a non-LC beacon transmitter 101 using measurements of multiple received beacon messages from one LC-RX 332. When the LC-RX 332 receives beacon messages 111 from a beacon transmitter 101, it records the RSS 511 of the beacon messages 111 and its own locations 105 when the message is received. The location of the beacon transmitter 101 is estimated using all or some of the RSS and corresponding receiver locations $P_{RX}(t)$. The estimated transmitter location can be calculated as follows:

$$P'_{TX} = \arg\max p(P_{TX}; \{RSS(t_i), P_{RX}(t_i)\})$$

where $t_i$ is the time index, $RSS(t_i)$ is the RSS of the messages received at $t_i$ by the LC-RX 332, and $P_{RX}(t_i)$ is the location of the LC-RX 332 at time $t_i$. The LC-RX 332 can perform the calculation itself, or the information can be sent back to the network for central processing.

As the beacon transmitter 101 does not have a locationing device attached to it permanently, when a beacon device (or the object where the beacon transmitter is attached to) is placed at location $P_{TX}$ 103, the location needs to be recorded. An example is a mover transporting a package in a warehouse. A mover can be a person, or a forklift equipped with a LC-RX. Each package can have a beacon transmitter attached. While the beacon transmitters are being moved, the beacon transmitters can be very close to the receiver, and therefore $P_{TX} \sim = P_{RX}$. The latest location of the package is recorded when it is placed (such as when it is unloaded from the forklift). Recording of the location where the package, or the beacon transmitter is placed can be triggered by a user operation, such as a click of button, or the unload operation of the forklift. The location of the transmitter is approximated as the location of the receiver at the instance of this event, i.e., $P_{TX} \sim = P_{RX}(t0)$, where $t0$ is the time the beacon transmitter is placed in a static location. The receiver location $P_{RX}(t0)$ is generated by the locationing device and is recorded. This invention also teaches a method of determining the location at which a beacon transmitter is placed automatically.

Assuming the same example of a mover carrying a package, a beacon transmitter (tag) is attached to the packet, and an LC-RX is installed on the mover. A mover can be a forklift, or a person. The LC-RX is continuously or periodically receiving the signal transmitted by the tag 101. When the package is being moved, the beacon transmitter (tag) is very close to the receiver as they are moving together. Prior to time t0, the transmitter and receiver are close to each other, and the location of the transmitter $P_{TX}$ 103 is updated continuously, following $P_{TX} = P_{RX}(t)$. At time t0, the beacon transmitter stops moving (e.g., a package is unloaded to a location in the warehouse). This location is $P_{TX} \sim = P_{RX}(t0)$ 550. $P_{RX}(t0)$ is the estimated receiver location at time t0. After t0, the transmitter remains at location $P_{TX}$ 550. The LC-RX continues to move. The LC-RX continuously receives beacon signals as it is moving at different locations 105 at time t1, t2, t3 and etc. Based on the received beacon signal, the LC-RX estimates the separation between the beacon transmitter and receiver. Once the separation is detected, (e.g., distance exceeds a threshold), it can stop updating the location of the transmitter. The last known location of the transmitter $P_{RX}(t0)$ 550 is then recorded as the location of the package $P_{TX}$. This process can be repeated as many times as needed. For example, the location of the package $P_{TX}$ can be recalculated each time an LC-RX enters the proximity of the package.

Figure 7:
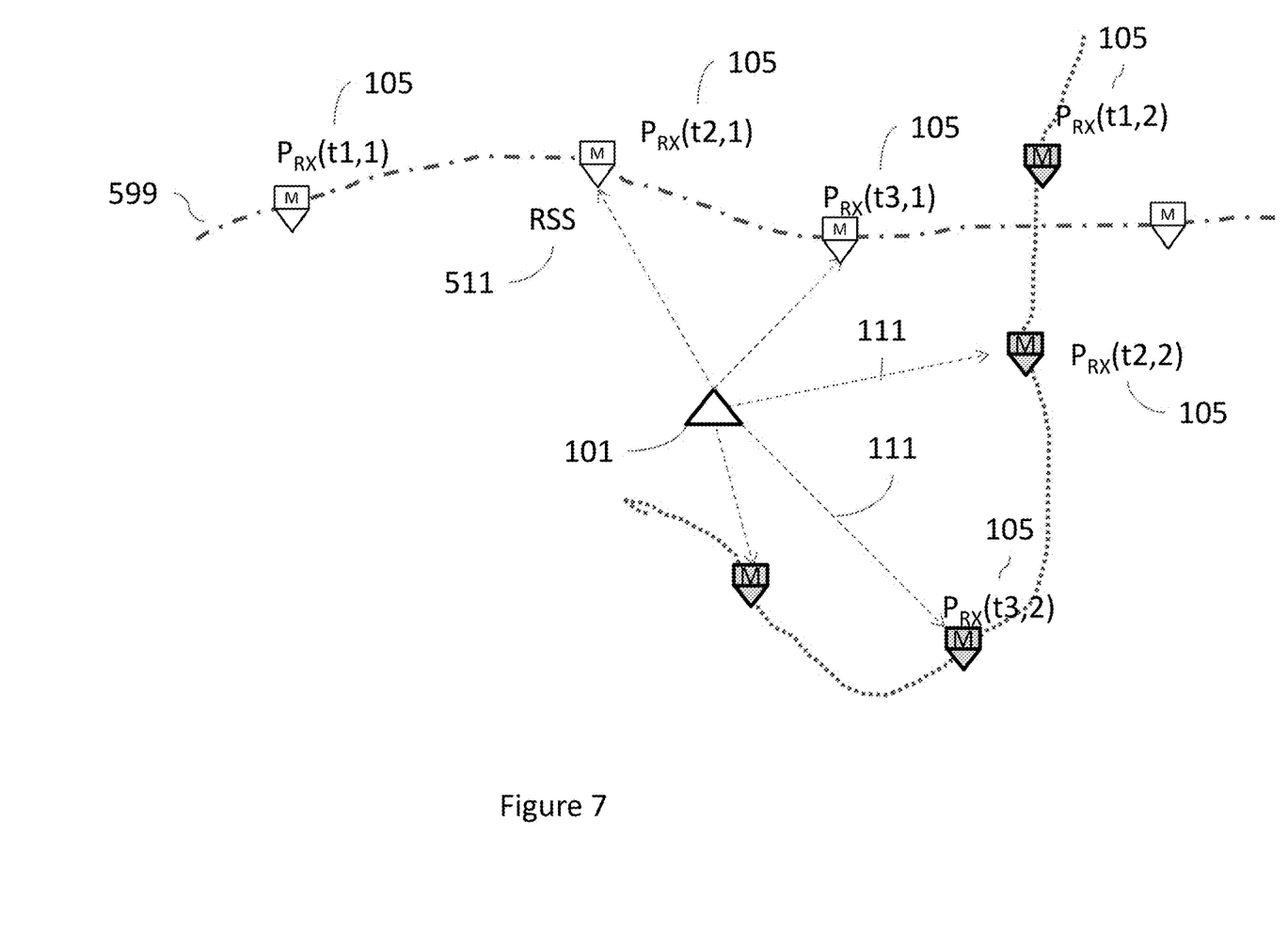
FIG. 7 illustrates a method of estimating a beacon transmitter location using measurements from multiple LC-RXs.

A beacon transmitter location can be also estimated using measurements from multiple LC-RXs. As shown in FIG. 7, one transmitter 101 and two LC-RXs 332 are used. However, any number of LC-RX devices can be used, so long as at least two are in the system. When the transmitter 101 broadcasts a beacon message 111, the message 111 is received by all LC-RXs 332 in range. The real-time location $P_{TX}(t)$ of the transmitter is estimated based on the measured RSS(t,j) at PRX(t,j), where $P_{RX}(t,j)$ is the location of the j-th LC-RX 332 at time t. FIG. 7 shows two LC-RXs receiving measurements at multiple times (t1, t2, t3, . . . ).

For example, a transmitter location can be estimated based on the maximum-likelihood estimation, given as following:

$$P'_{TX}(t) = \arg \max p(P_{TX}; \{RSSj(t,j), P_{RX}(t,j)\})$$

This method can be used to estimate a location of a beacon transmitter 101 whose location may not be stationary. This is different from the previously described method of FIG. 6, where measurements of multiple received messages from a single LC-RX are used. In the latter case, it requires the beacon transmitter 101 be stationary. However, it can be easily understood that if the transmitter 101 is stationary, the transmitter position estimated can be based on measures of multiple beacon messages 111 from multiple LC-RXs 332 using the system of FIG. 7.

Furthermore, the suggested system can also be used for generating RF fingerprints automatically. 'Fingerprinting' means to associate the location dependent signal characteristics, such as RSS 511, with the locations of the transmitter and receivers. Fingerprints are used for computing the likelihood of a tag location for estimating the tag location. Traditional fingerprint processes are carried out manually and are labor intensive and time consuming. To perform fingerprinting automatically, the LC-RX can measure the received signal from a known transmitter and also estimates the receiver location simultaneously. The LC-RX can then form an association of the transmitter location, receiver location, and signal strength {PTX, PRX, RSS}. This information is used to create, expand or update the fingerprints.

The fingerprints can then be used to determine the location of a non-LC beacon receiver 101. Basically a beacon receiver 101 reports RSS of beacon messages. Its location can then be estimated using the reported RSS. Even though we use RSS as the measured signal signature in the examples, other characteristics of the RF signal may be used in all the techniques described above.

Figure 8A:
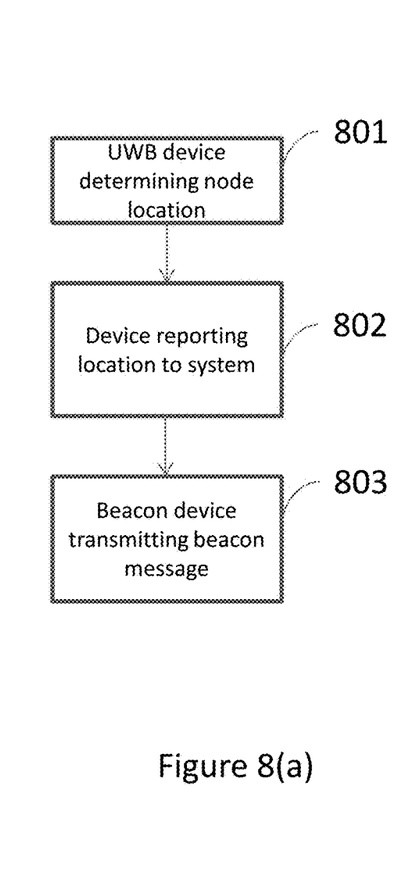
FIG. 8(a) illustrates a flow chart of updating the beacon transmitter location.

Beacon-based location services (e.g., iBeacon) can benefit from using automatically updated beacon transmitter locations. The automatic location updates can eliminate the need for manual configuring of the transmitter position and eliminates possible human error. The automatic process more importantly can prevent delivering services based on obsolete location information. FIG. 8(*a*) is a flowchart showing how a beacon transmitter system with an LC-TX 331 is used to determine the up-to-date location. In step 801, the up-to-date location is produced by the locationing device in the LC-TX 331. In step 802, the location is then reported back to the system to update the service associated with the given beacon transmitter. The device can then transmit standard beacon messages with the ID of the device included in the message in step 803. A beacon receiver 110 can receive the beacon messages, retrieves the beacon ID, and then obtain the service associated with the ID.

Figure 8B:
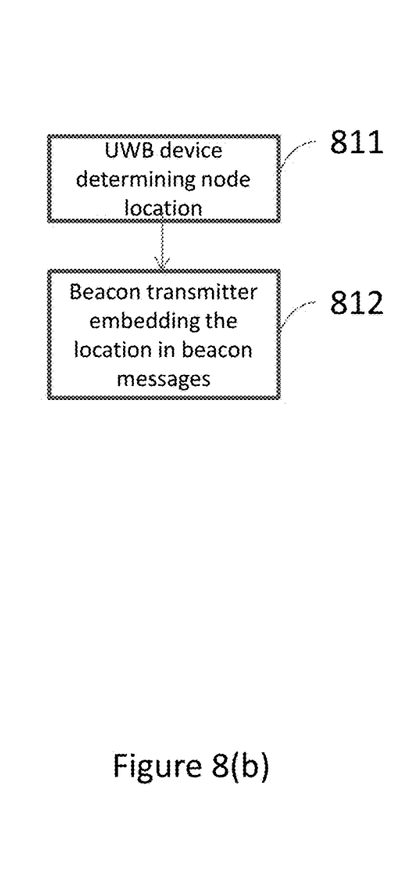
FIG. 8(b) illustrates a flow chart of updating the beacon transmitter location and embedding the location information in the transmitted messages.

As an alternative implementation, the LC-TX 331 can embed the up-to-date in the broadcast beacon messages directly, as shown in the flowchart in FIG. 8(*b*). The UWB device can first determine the node location, as shown in step 811 then send to the node location to the LC-TX 331. Once the LC-TX 331 has had its location updated, that updated location can then be embedded directly in a beacon message as shown in step 812.

Figure 8C:
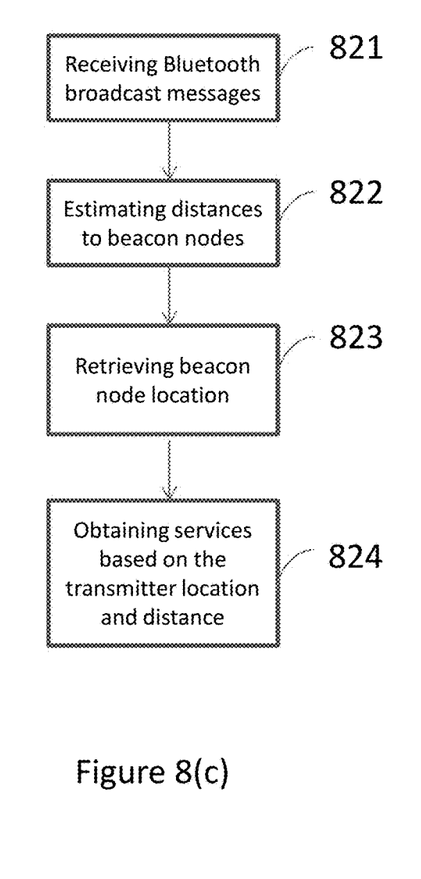
FIG. 8(c) illustrates a flow chart of obtaining location based services by a beacon receiver.

FIG. 8(*c*) shows the flow chart showing what occurs in the corresponding beacon receiver when the LC-TX location is embedded in beacon messages. The receiving node receives broadcast beacon messages in step 821, estimates its distance to the beacon transmitter based on the signature of the received signal such as signal strength in step 822. The receiving node then recovers the beacon transmitter location from the received beacon message in step 823. Then the receiving node retrieves corresponding services based on the transmitter location and the estimated receiver location in step 824.

Multi-Tiered Location Networks and Methods of Use

Figure 10:
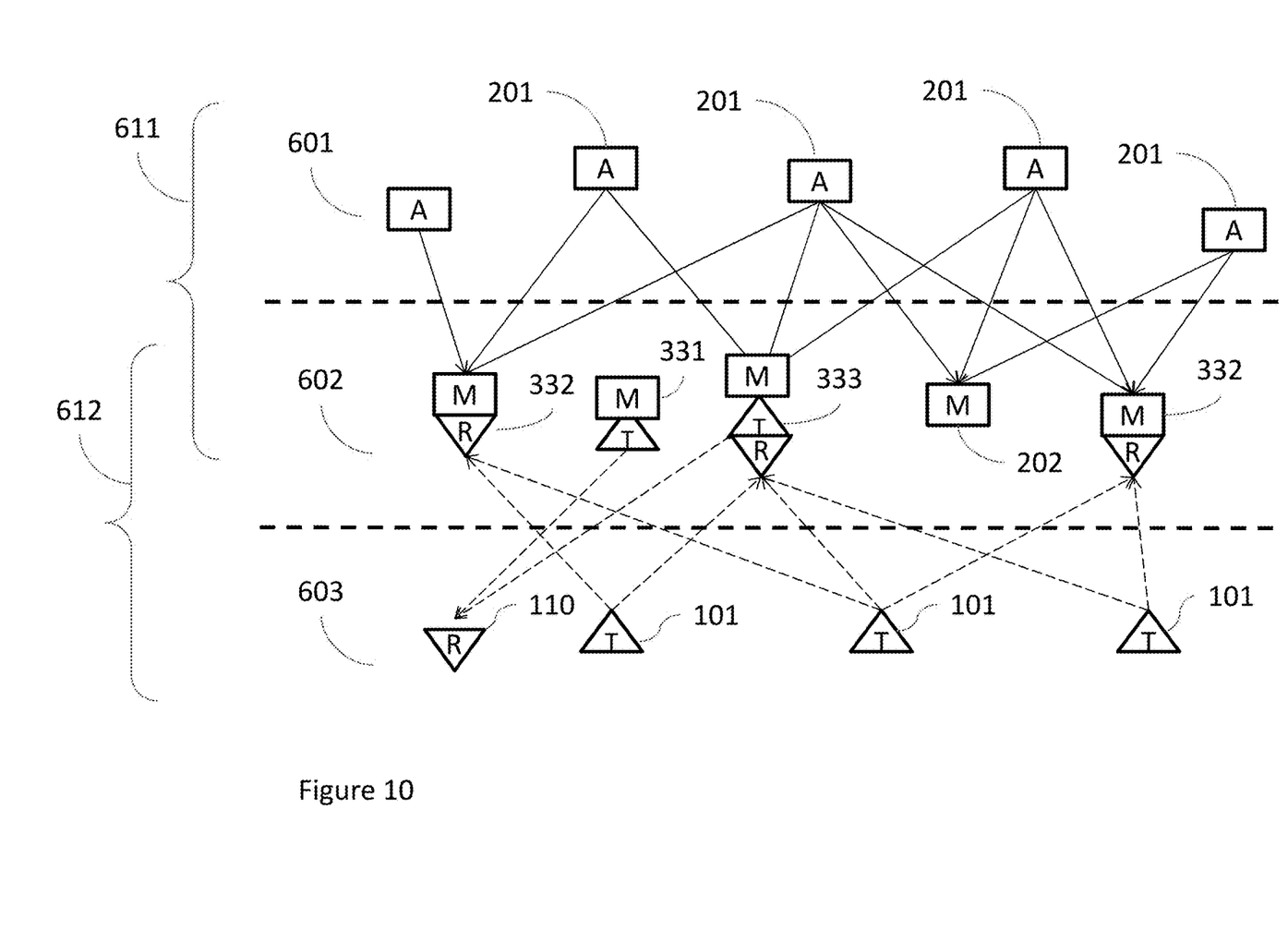
FIG. 10 illustrates a two-tiered location service system.

FIG. 10 shows the structure of a two-tiered location service system according to one embodiment. To illustrate the principle of such a multi-tiered system, UWB-based location systems are used as the location technology for the first tier of service and Bluetooth technology for the second tier of service. It is understood that wireless technologies, such as WiFi, RFID, Near Field Communication (NFC), or others can be used as the underlining technologies.

In the example shown in FIG. 10, the first tier of location service 611 uses UWB technology which delivers high accuracy. The first tier 611 is formed by a plurality of UWB devices 201 that form the infrastructure network 601 and provide high precision location services. Nodes 601 can be considered as first tier service provider. A plurality of UWB tags 602 can receive service from the UWB infrastructure network 601. The infrastructure network and UWB tags 602 form the first tier of location service system 611.

Some of the UWB tags 602 are equipped with beacon devices, i.e., transmitters, receivers, or transceivers, and therefore are location capable devices (location capable transmitter 331, location capable receiver 332, and location capable transceiver 333). The beacon devices in layer 602 form another tier of location system, providing location services to beacon devices in layer 603. The beacon devices do not have UWB modules attached. Some of the devices in layer 602 and 603 form a second tier of location service 612. Devices can be transmitters, receivers, or transceivers. The overlapping layer 602 of the two tier system provides the overall system with the benefits of two types of devices, each having particular unique benefits. The multi-tiered system allows for a network to be enhanced without requiring the lowest layer, where end users are often located, to update to new hardware to receive the benefits of the enhanced locationing system.

While the system is shown in FIG. 10 as having three layers and two tiers, any number of layers and tiers can be included in the network. For example, the multi-tiered network can include a top layer, a first midlevel layer, a second midlevel layer, and a bottom layer. The top layer and the first midlevel layer can form the first tier; the first midlevel layer and the second midlevel layer can form the second tier; and the second midlevel layer and the bottom layer can form the third tier. Layers and tiers can be added to increase the functionality of the system as required. The two tiers 611 and 612 may use different technologies for locationing. Furthermore, devices in each tier may not be homogeneous. The location information from one tier may be passed to adjacent layers. The described system allows a single network to provide location services with different level of accuracy.

As one example, a multi-tiered RTLS system can be deployed in a retail store. A UWB infrastructure network is deployed in the store. Tags with integrated UWB device and Bluetooth transceiver (UWB-BT tag) can be carried by the store clerks. The accurate real-time position information provided by the UWB network provides location services to clerks, store manager and other people. These mobile UWB-BT devices also continuously broadcast their real-time locations in Bluetooth messages (e.g., iBeacon compatible messages). A consumer using a Bluetooth-enabled device (e.g., a smart phone) is able to receive these messages and estimate his current location. A consumer can subsequently receive location based services, which requires degraded accuracy. These services may include in-store navigation, promotion notification, advertisement and etc. A clerk carrying a UWB-BT device can also carry out inventory tracking if items have Bluetooth transmitter 101 attached to.

Method for Real-Time Safety Alerting

Figure 9:
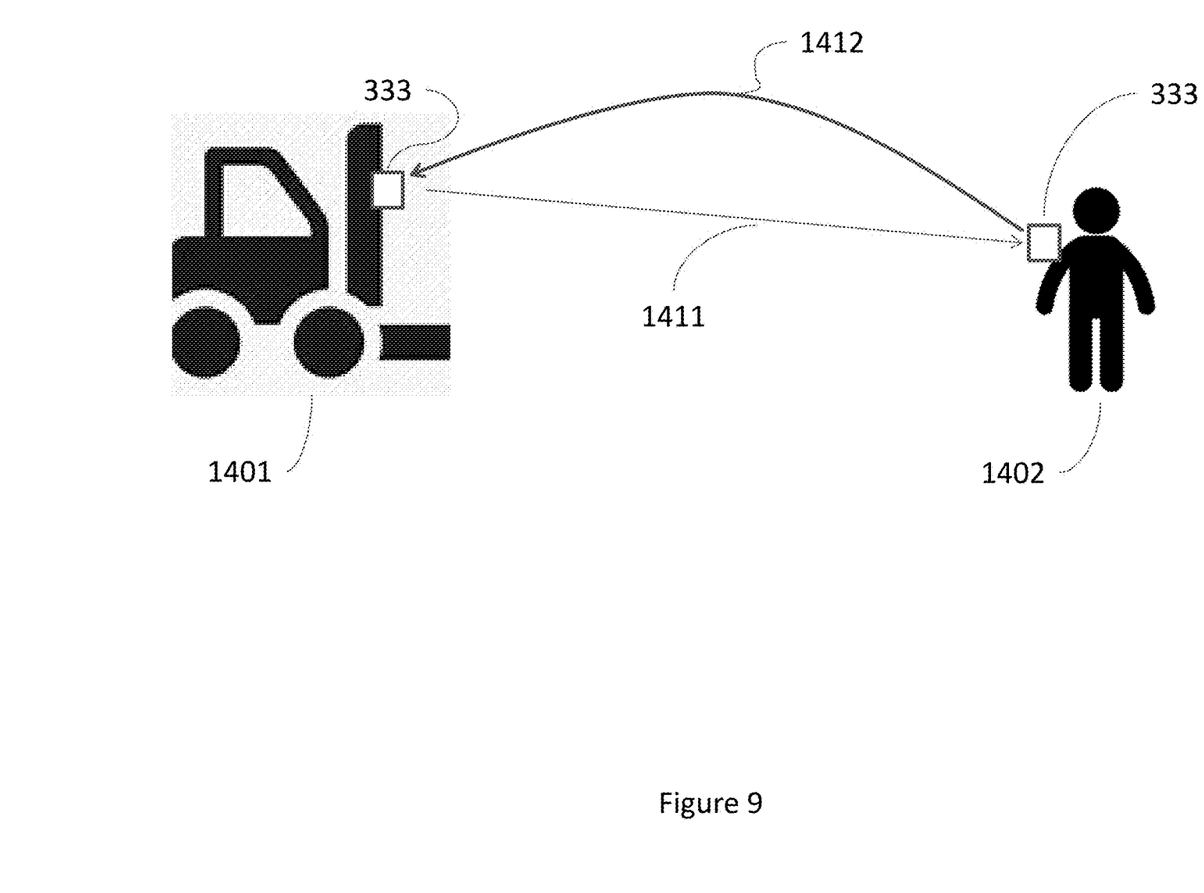
FIG. 9 illustrates a safety alert system using location-enabled beacon devices.

FIG. 9 illustrates a system for generating real-time safety alert using LC beacon devices. It is often desirable to use the relative locations of objects to avoid collision or other types of damage or injury.

For example, two objects, a first object 1401 and a second object 1402, one or both of them may be mobile, can result a safety breach when they are too close to each other. The first object 1401 can be equipped with a LX-XCVR 333 that continues broadcast its real-time location in safety beacon messages 1411. The second object 1402 equipped with a LC-XCVR 333 receives the broadcast messages 1411 when the mobile object 1402 is within the receiving range. The LX-XCVR 333 of the second object estimates the distance between the first object 1401 and the second object 1402. The LC-XCVR 333 on the second object may activate an alert based on the safety rule and the estimated distance between the two objects. A safety rule can be predefined or embedded in the broadcast beacon messages.

Additionally, it is possible for the LC-XCVR 333 on the second object 1402 to transmit a beacon messages back to the first object 1401. Possible safety breaches can include when objects are too close to each other; or alternatively, when objects are too far from each other, or any distance based rules. The alerts can have a single predefined rule, or alert level. Alternatively, the alerts can have multiple levels, such that they increase in loudness or severity as a maximum threshold is reached.

In the example, LC-XCVR 333 is used as location capable devices. However, it is understood that an LC-XCVR 333 can be replaced by an LC-TX 331 if the device only needs to transmit, and similarly, by an LC-RX 332 if only receiving is needed. Additionally, a LC device can be replaced by a regular beacon device if the object it attaches to is stationary (or portable) and its location can be entered manually or through other means.

One example of such an application is a forklift equipped with the LC-XCVR 333 continuously broadcasts its location in the safety beacon messages. Workers equipped with LC-XCVRs 333 will receive alerts when the said forklift is within the safety distance. The alert can also be sent back to the forklift in the beacon messages by the worker's LC-XCVR 333 to inform the driver of the forklift.

Application Examples

Figure 11A:
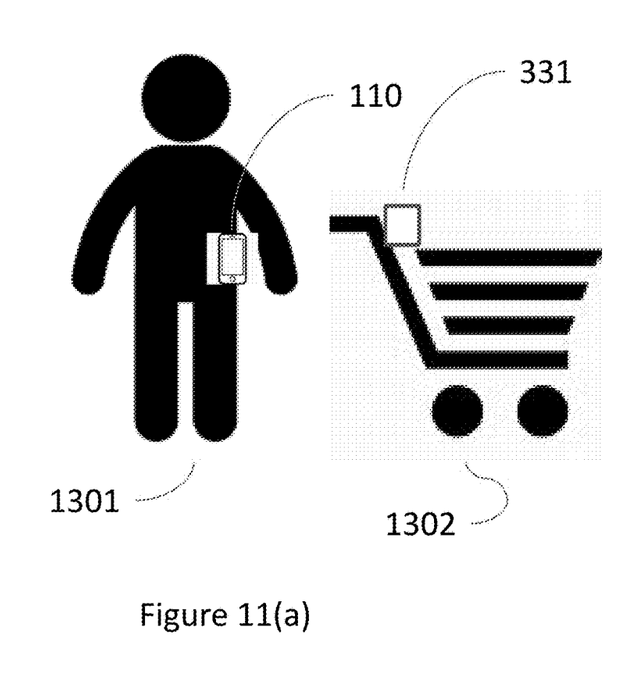
FIG. 11(a) illustrates a location-enabled shopping cart broadcasting real-time location to a shopper.

FIG. 11(a) shows a shopping cart that is equipped with a LC-TX 331 that can broadcast real-time information. A person 1301 carrying a beacon receiver 110 (e.g., a smart phone) will receive beacon messages from the LC-TX 331 on the cart 1302. The beacon message can either contain the location information that the smart phone can use to obtain services associated with the location, or include the services in the message using the method described in FIG. 4 above.

Figure 11B:
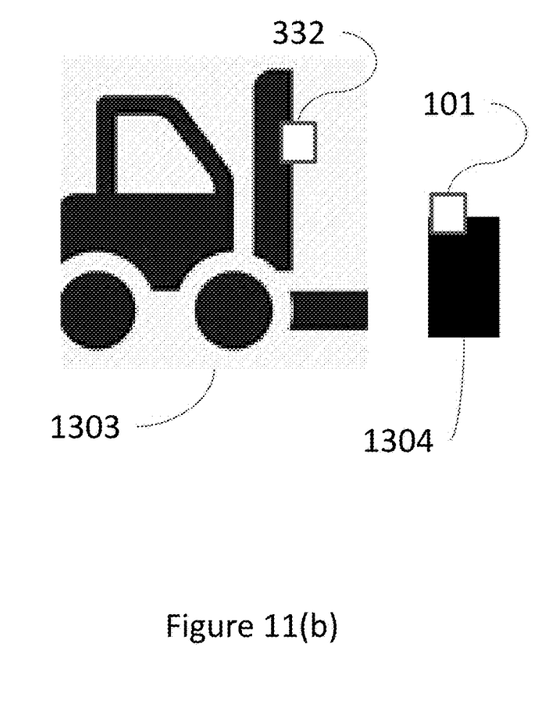
FIG. 11(b) illustrates a location-enabled forklift tracking a pallet with beacon transmitter installed.

FIG. 11(b) shows another other use case, here a forklift 1303 moves the pallet 1304 that can have a beacon transmitter 332 attached as asset tag. The forklift is equipped with a LC-RX 332, where the pallet is equipped with a beacon transmitter 101. The LC-RX on the forklift receives beacon signals from the transmitter 101 attached to the pallet. When the pallet is being moved, the LC-RX 332 is very close to the transmitter. When the pallet is dropped off and forklift starts moving away from the pallet, the LC-RX detects that pallet is no longer close and the received signal strength of the beacon message is below a threshold. When this occurs, the last known location of the pallet is reported, using the method described above in FIG. 5.

One other application example can be a site surveyor carrying a LC-RX walking through an area where all assets are located. While walking through the sites, the LC-RX records all the measured RSS from all beacon transmitters and the locations where these measurements are taken. The locations of all assets in the area can be estimated using recorded RSS and corresponding locations using the method illustrated in FIG. 6 and described above.

In yet another application example, several LC-RXs 332 can be deployed in an area for locating all assets with beacon transmitters attached using the method discussed above in FIG. 7.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

We claim:

1. A method of provisioning multiple tiered location services by a network of wireless devices, the method comprises:
forming multiple location service layers with a plurality of wireless devices including a top layer, at least one midlevel layer, and a bottom layer;
forming a first tier service provider with the top layer and one of the at least one midlevel layer;
forming a second tier service provider with one of the at least one midlevel layer and the bottom layer; sending location services by location-capable devices in the first tier; and
providing location services in the second tier, wherein the top layer includes at least one location service providing device, wherein the at least one midlevel layer includes at least one location service providing device and at least one location service receiving device, and wherein the bottom layer includes at least one location service receiving device.

2. The method of claim 1, wherein the location service receiving device includes a Bluetooth or Bluetooth Low Energy beacon.

3. The method of claim 1, wherein the location service providing device is an Ultra-Wideband device.

4. A method of recording the last known location of a beacon transmitter using a location-capable beacon receiver, the method comprising:
- receiving, by the location capable beacon receiver, a beacon message from the beacon transmitter;
- estimating a distance from the location capable beacon receiver to the beacon transmitter based on a signal signature of the beacon message;
- recording the location of the location capable beacon receiver when the estimated distance is within a pre-determined threshold; and
- reporting the last known recorded location of the beacon transmitter by the location capable beacon receiver.

5. The method of claim 4, wherein the reporting of the last known recorded location of the beacon transmitter is triggered when the estimated distance is greater than the pre-determined threshold.

6. The method of claim 4, wherein the reporting of the last known recorded location of the beacon transmitter is triggered by a user.

7. The method of claim 4, wherein the signature is the signal strength.

8. The method of claim 4, wherein the signature is the time-of-flight.

9. A method of generating a real-time safety alert using location-capable beacon devices, the method comprising:
- attaching a first beacon device to a first object; attaching a second beacon device to a second object;
- the first beacon device broadcasting its own location embedded in beacon messages;
- estimating, by the second beacon device, the distance between two beacon devices; and
- producing an alert when a safety breach is detected based on the estimated distance.

10. The method of claim 9, wherein one or both beacon devices are location-capable beacon devices.

11. The method of claim 9, the method further comprises, producing a local alert by the second beacon device.

12. The method of claim 9, the method further comprises, reporting the alert to a system by the second beacon device.

13. The method of claim 9, the method further comprises, transmitting the alert back to the first beacon device by the second beacon device.

14. A system of provisioned multiple-tiered location services, comprising:
- a plurality of ultra-wideband devices forming a top layer of a wireless infrastructure network;
- a plurality of location capable beacon devices forming a bottom layer of the wireless infrastructure network;
- at least one midlevel layer that includes a plurality of wireless devices that includes both locationing devices and beacon devices;
- the top layer and the at least one midlevel layer form a first tier service provider, and the at least one midlevel layer and the bottom layer form a second tier service provider;
- the top layer includes a least one location service providing device; and
- the bottom layer includes at least one location service receiving device.

15. A system of claim 14, wherein the at least one midlevel layer further includes: an infrastructure network formed by the plurality of Ultra-Wideband devices; and the plurality of ultra-wideband tags estimate their own locations.

16. The system of claim 14, wherein the location service receiving device is a Bluetooth, or Bluetooth low energy real-time location beacon.

17. The system of claim 14, wherein the second tier is an Radio Frequency Identification (RFID) system.

18. The system of claim 17, wherein the RFID system further includes a location capable RFID reader and RFID tags.

19. A system for generating real-time safety alerts, comprising;
- a first beacon device attached to a first object;
- a second beacon device attached to a second object;
- the first beacon device is configured to broadcast its own location in beacon messages;
- the second beacon device is configured to estimate the distance between two beacon devices; and
- the second beacon devices is configured to produce alerts when a safety breach is detected based on the estimated distance.

20. The system of claim 19, wherein the first beacon device includes an ultra-wideband tag that is configured to generate its own location.

21. The system of claim 19, wherein the first beacon device includes a Bluetooth (BT), Bluetooth Low Energy (BLE), or BT long range device, capable of either receiving or transmitting BT/BLE beacon messages.

22. The system of claim 19, wherein the second beacon device is a Bluetooth (BT), Bluetooth Low Energy (BLE) or BT long range device.

* * * * *